United States Patent [19]
Boutet et al.

[11] Patent Number: 5,328,019
[45] Date of Patent: Jul. 12, 1994

[54] AUTOLOADER FOR CASSETTES AND/OR PALLET

[75] Inventors: John C. Boutet, Rochester; Roger S. Brahm, Canandaigua; Darryl D. DeWolff, Rochester; Jeffrey J. Yaskow, Williamson, all of N.Y.

[73] Assignee: Eastman Kodak Company, Rochester, N.Y.

[21] Appl. No.: 981,719

[22] Filed: Nov. 25, 1992

[51] Int. Cl.⁵ .................................... B65G 29/00
[52] U.S. Cl. .................................. 198/624; 414/331
[58] Field of Search .............. 198/624, 465.3, 803.2; 414/331, 416, DIG. 3

[56] References Cited

U.S. PATENT DOCUMENTS

| | | | |
|---|---|---|---|
| 3,687,260 | 8/1972 | Willows | 198/624 X |
| 3,811,586 | 5/1974 | Lavoie | 198/624 X |
| 3,844,399 | 10/1974 | Sellers, Jr. et al. | 198/624 |
| 3,858,708 | 1/1975 | Hollenton et al. | 198/624 X |
| 3,902,773 | 9/1975 | Gondek | 312/223 |
| 4,479,572 | 10/1984 | Merz | 198/465.3 X |
| 4,561,819 | 12/1985 | Wiernicki | 414/331 |
| 4,789,782 | 12/1988 | Ohara | 250/327.2 |
| 4,875,670 | 10/1989 | Petersen et al. | 198/624 X |
| 4,892,455 | 1/1990 | Hine | 414/417 |
| 5,020,579 | 6/1991 | Strong | 198/624 X |
| 5,157,504 | 10/1992 | Shiraishi et al. | 414/331 X |

FOREIGN PATENT DOCUMENTS

| | | | |
|---|---|---|---|
| 2108453 | 9/1971 | Fed. Rep. of Germany | 198/624 |
| 61-273441 | 5/1985 | Japan | 414/331 |
| 0226626 | 9/1989 | Japan | 414/331 |

Primary Examiner—James R. Bidwell
Attorney, Agent, or Firm—Dana M. Schmidt

[57] ABSTRACT

A mechanism and method for conveying a cassette or similar like article from a support surface into an adjacent apparatus. The mechanism comprising: a first pinch roller having a central axis about which the first pinch roller rotates; a second pinch roller having a central axis about which the second pinch roller rotates; a mechanism for moving the first and second pinch rollers toward each other so as to engage a cassette therebetween with a predetermined amount of biasing force; and a motor for rotating the first and second pinch rollers manner about their respective axis so as to move the cassette from and/or on to the support surface.

26 Claims, 16 Drawing Sheets

5,328,019

AUTOLOADER FOR CASSETTES AND/OR PALLET

CROSS REFERENCE TO RELATED APPLICATIONS

Reference is made to the following commonly assigned copending U.S. Applications:

U.S. Ser. No. 902,214, entitled "X-ray Cassette Positioner", filed Jun. 22, 1992 in the name of John C. Boutet;

U.S. Ser. No. 800,799, filed Nov. 27, 1991, entitled "X-ray Cassette Having Removable Photographic Element" by Jeffrey C. Robertson.

BACKGROUND OF THE INVENTION

The present invention pertains to equipment used in processing photosensitive material, and more particularly to an autoloader for feeding cassettes and/or pallets containing cassettes to and receiving them from a computed radiographic reader.

It is convenient to handle storage phosphorous film/plates within cassettes that protect the film from extraneous light and damage. Storage phosphorous film is read by photoelectrically detecting an image formed by scanning with stimulating radiation. An example of such a scanner/reader is disclosed in U.S. application No. 4,789,782 to O'Hara. It is desirable to retain the x-ray film within a cassette except during actual processing. Such a cassette is disclosed in U.S. patent application Ser. No. 800,799, filed Nov. 27, 1991, entitled "X-ray Cassette Having Removable Photographic Element" by Jeffrey C. Robertson, which is incorporated herein by reference. A hook extractor can be used with the x-ray cassette to move a photographic element to and from an x-ray reader for processing. It is desirable to provide an apparatus to automate the presentation of such x-ray cassettes or similar cassettes to such an extractor so that a number of x-ray cassettes could be processed in succession without attention from an operator. It is also desirable that such an apparatus be able to accurately position x-ray cassettes and/or pallets containing cassettes sequentially to simplify removal and reinsertion of the photographic elements and that the presentation apparatus be separate from the x-ray reader to permit interchange of units and reduce repair time. An example of a suitable device for presenting cassettes is disclosed in copending application U.S. Ser. No. 902,214 filed Jun. 22, 1992, entitled "X-ray Cassette Positioner" of John C. Boutet et al which is also hereby incorporated by reference. In this reference there is disclosed a positioner/autoloader for use with a plurality of x-ray cassettes and/or pallets containing cassettes which comprise first and second cog belts spaced apart so as to provide a plurality of cassette retaining sites one of which defines a cassette read site for presenting of the cassette to the reader. The belts are driven such that the cassettes are each individually positioned at the load site for removal of the photosensitive film therein for reading by the reader after which it is returned to the cassette. The positioner allows a plurality of individual cassettes to be placed thereon for automatic supplying to the reader thus freeing the operator to accomplish other duties. With such positioners it is important to provide a mechanism for properly locating a cassette with respect to the reader so that the reader can unlock the cassette and withdraw the photographic element therefrom. Likewise, the mechanism must be able to remove the cassette from the reader and return it to the cog belt and its appropriate storage position. It is important that the mechanism be designed to operate in such a manner so as to minimize any transfer of vibrations from the autoloader to the reader which can adversely affect the reader reading the information stored on the photo stimulable phosphorous film. It is also important that the cassette be properly positioned each time so that the mechanism for opening the cassette and removing the photo stimulable film is properly oriented so that misalignment of the unlatching mechanism does not occur.

In accordance with the present invention there is provided a mechanism for transferring of cassettes from the autoloader to the reader and back to the autoloader in a reliable manner while also precisely positioning of the cassette within the reader to allow proper clamping of the cassette and permit removal of the storage phosphorous film therein. The mechanism is also designed to minimize transfer of vibration to the reader which can adversely affect the reading of the photographic element.

SUMMARY OF THE INVENTION

In one aspect of the present invention there is provided a mechanism for conveying a cassette or similar like article from a support surface into an adjacent apparatus. The mechanism comprising:

a first pinch roller having a central axis about which the first pinch roller rotates;

a second pinch roller having a central axis about which the second pinch roller rotates;

means for moving the first and second pinch rollers toward each other so as to engage a cassette therebetween with a predetermined amount of biasing force; and means for rotating the first and second pinch rollers manner about their respective axis so as to move the cassette from and/or on to the support surface.

In another aspect of the present invention there is provided a method of delivering a cassette or other similar like article from a support surface to an apparatus, comprising the steps of:

providing a cassette or other similar like article on a substantially horizontal support surface;

providing means for removing the cassette from the support surface in a substantially horizontal direction while also lifting the forward end of the cassette from the horizontal support surface.

BRIEF DESCRIPTION OF THE DRAWINGS

In the detailed description of the preferred embodiment of the invention presented below reference is made to the accompanied drawing, in which.

DESCRIPTION OF A SPECIFIC EMBODIMENT

Figure 1:
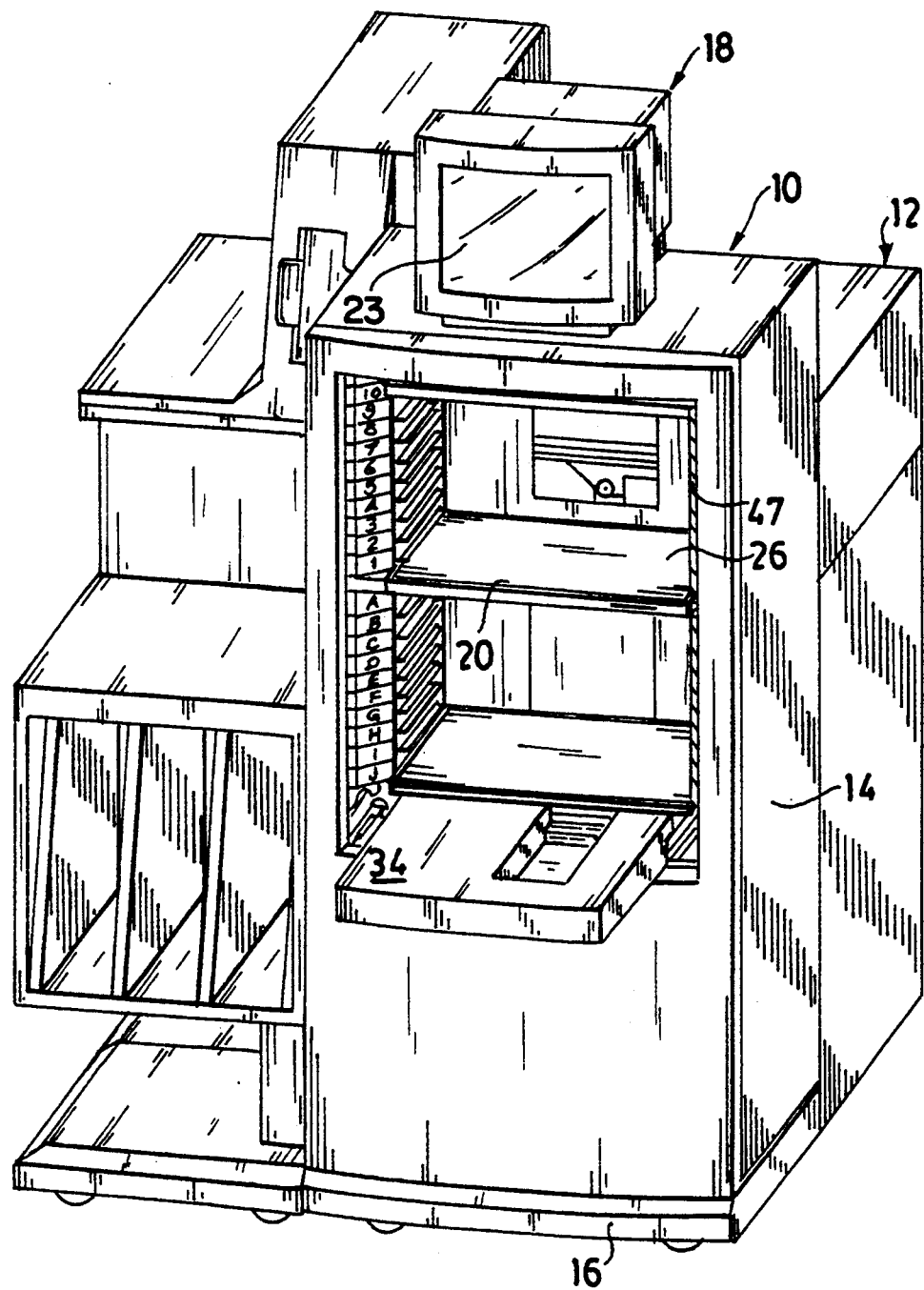
FIG. 1 is a front perspective view of an x-ray cassette autoloader/positioner made in accordance with the present invention along with an x-ray reader and monitor illustrating the door assembly in the open position and the retractable shelf in the extended position.
Figure 1A:
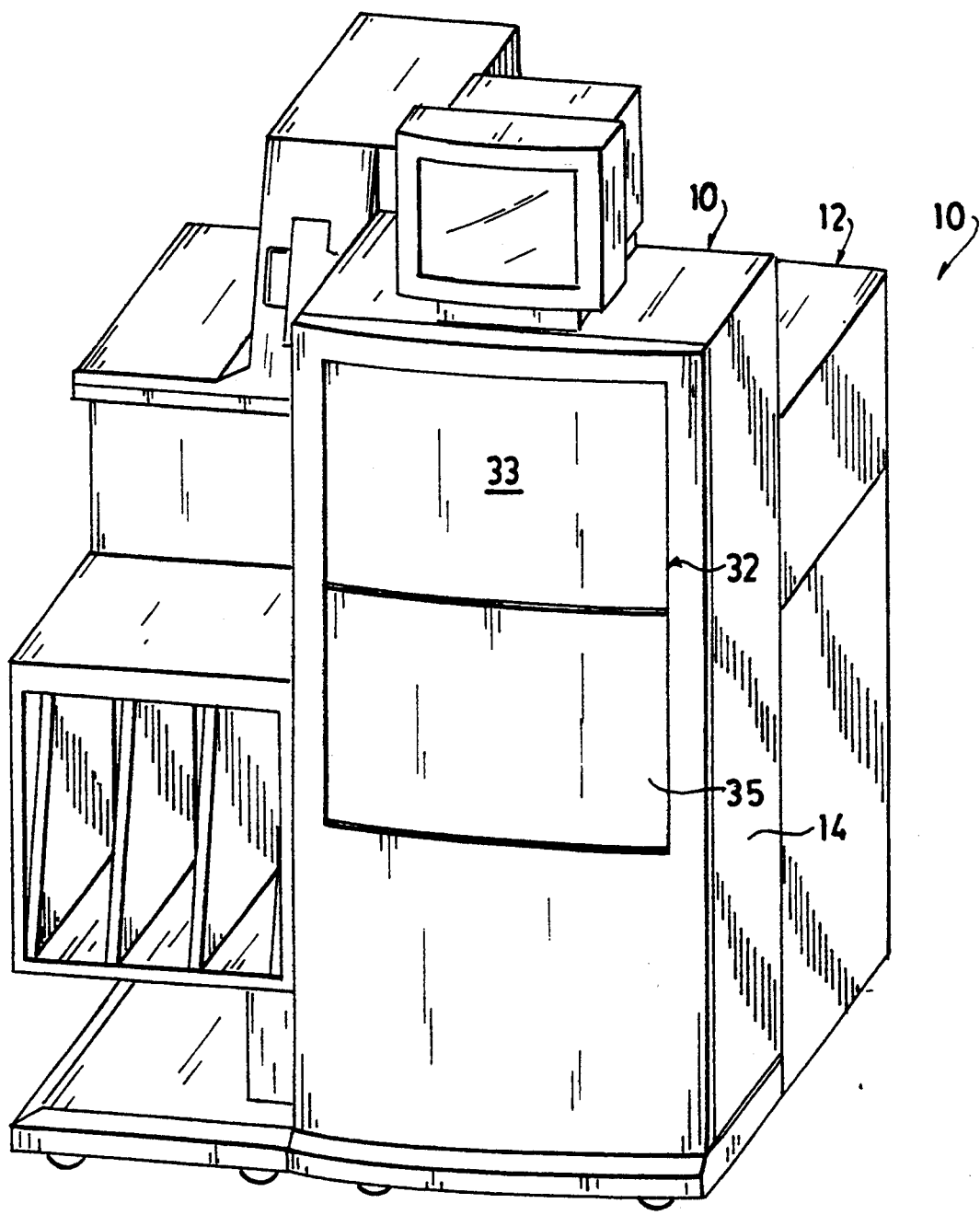
FIG. 1A is a view similar to FIG. 1 illustrating the retractable shelf in the retracted position and the door assembly in the closed position.

Referring to FIGS. 1 and 1A there is illustrated an autoloader (10) made in accordance with the present invention positioned directly in front of an X-ray reader (12). The autoloader has a body (14) with a base (16) at the bottom and a monitor station (18) on top. The body (14) can be made of sheet metal or the like reinforced as necessary to support loads imposed by the autoloader components and x-ray cassettes (20) or pallets containing cassettes. The cassette is of the type wherein the photosensitive material is removed through one of the sides of the cassette such as that described in pending application of Jeffrey C. Robertson, U.S. Ser. No. 800,799, previously referred to herein. Briefly, the cassette comprises shell having upper and lower panels and three side caps joining the upper and lower panels, and a removable end cap. A photographic element, such as stimulable phosphor plate, is provided within the cassette and is secured to the removable end cap. The end cap includes a latching mechanism for releasing the end cap from the cassette. A latch bar having at least one hook is used to latch or unlatch the latching mechanism. It is to be understood that other cassette construction may be used as appropriate, such as that disclosed in U.S. application No. 5,065,866 and U.S. application No. 5,090,567. Additionally, as previously mentioned, the autoloader may also feed pallets containing cassettes. An example of a suitable pallet for use in the autoloader 10 is described in copending application filed concurrently with this application entitled "Pallet for Holding a Cassette" of Wayne Arseneault, John C. Boutet, James F. Owen, Thomas Dale Baker and Jeffrey Yaskow, which is hereby incorporated by reference. Monitor station (18) may include some means for preventing inadvertent movement of the monitor (23), such as indentations. At the rear, body (14) has an access opening (24), as best seen by reference to FIG. 2, through which the forward end of a cassette is passed so that the forward end of the cassette (20) is placed within the adjacent x-ray reader (12). At the front, body (14) has a portal (26) which is generally rectangular in shape and provides access to the interior of body (14). Facing portal (26) is an operator station, which may be occupied by an operator. Door assembly (32) of body (14) is operable between a closed position, as shown in FIG. 1A, in which the portal (26) is closed and an open position, as shown in FIG. 1 in which the interior of body (14) is accessible through portal (26). The operation and function of door assembly (32) is set forth in greater detail in copending application entitled "Door Assembly For Cassette Autoloader" filed concurrently herewith of Wayne Arseneault, John C. Boutet, Darryl D. DeWolff, James Lattimore, Gary Shope and Jeffrey J. Yaskow, which is hereby incorporated by reference. Briefly, the door assembly includes a pair of panels (33),(35) slideably mounted to body (14) such that when in the closed position the portal (26) is closed. However, for the purpose of this invention any door assembly desired may be utilized.

Autoloader (10) includes a retractable table (34), which can be moved between an extended stacking position, as shown in FIG. 1 and a storage retracted position, inside body (14). In the storage retracted position the retractable table (34) is disposed totally within the body (14) so that the door assembly (32) can be closed as shown in FIG. 1A. Table (34) can be used to hold x-ray cassettes (20) and/or pallets (not shown) containing cassettes during loading and unloading. The details of the construction and operation of the retractable table (34) is described in greater detail in copending application filed concurrently with the present invention of John C. Boutet, Darryl D. DeWolff, James Lattimore, James J. Sheridan and Jeffrey J. Yaskow entitled "Autoloader Having a Retractable Shelf". Alternatively, x-ray cassette (20) can be loaded or unloaded from a cart (not shown). Controls are provided to permit the operator to either open the door assembly (32) and have the table (34) extended automatically, or to open only the door (32) without extending of the retractable table. A wide variety of means may be employed for controlling operation of the autoloader which are well known in the prior art. In the particular embodiment illustrated the autoloader is provided with a microprocessor which is appropriately linked up to various switches, motors and controls to operate the door assembly and retractable table and various other functions of the device in a pre-set pattern. Such controls are well known and therefore will not be discussed further.

Figure 2:
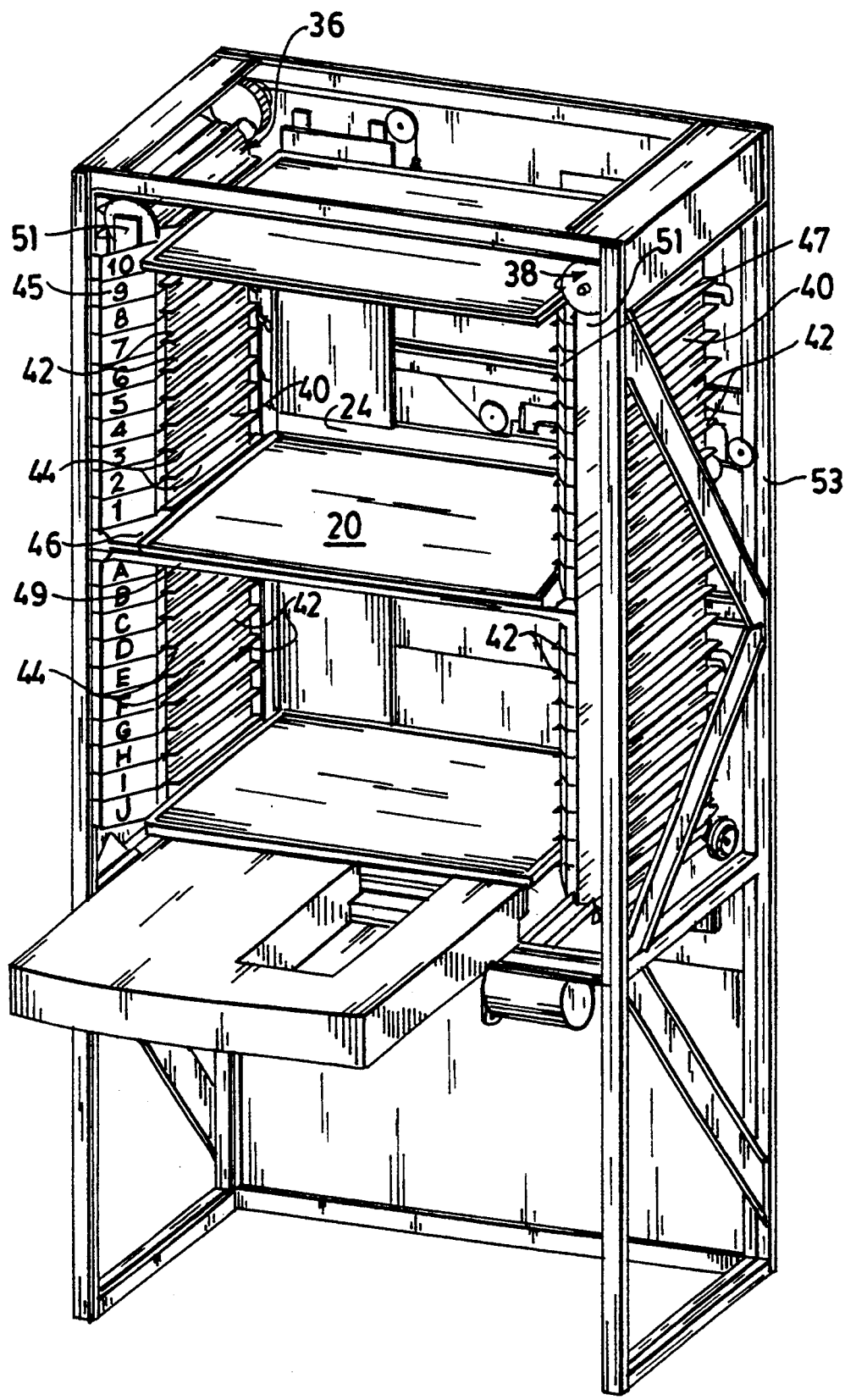
FIG. 2 is a perspective view of the autoloader of FIG. 1 with the outer shell removed illustrating the cog belts used to move and store the cassettes.

Referring to FIG. 2 the autoloader is provided with a first and second conveyor assemblies (36), (38), respectively. Each conveyor assembly (36), (38) is provided with an endless cog belt (40). Each cog belt (40) having a plurality of regular space shelves (42). The cog belts (40) are aligned and driven such that the shelves (42) provide a plurality of vertically arranged cassette sites (44) within body (14). In line with the center of access opening (24) there is provided a read site (46) whereby the cassette when placed in such position can be advanced for reading into the adjacent x-ray reader (12). The cassette sites (44) above reading site (46) are loading sites wherein cassettes which have yet to be read are placed. In the particular embodiment illustrated these loading sites are identified by numerals, one through ten, place on side panels (45),(47) as shown in FIG. 2. The cassettes sites (44) below read site (46) are unloading sites and are preferably identified by different indicia from that of loading sites. In the particular embodiment illustrated, the unloading sites are identified by letters and in particular, by the letters A–J. Cassettes (20) can be interchanged between loading sites easily since each cassette is supported by a pair of vertically aligned shelves (42) and cassettes (20) are spaced apart from each other by a distance sufficient to permit each individual cassette (20) to be gripped while positioned fully to the back of every cassette site (44). While only one read site is provided, any number of loading and unloading sites may be provided as desired. In the particular embodiment illustrated, there are provided ten loading sites and ten unloading sites. To prevent accidental placement or attempted removal of a cassette from read site (46), a cross bar (49) is secured to body (14) in front of read site 46.

The cog belts (40) are driven in unison by a drive means provided. An example of a mechanism used to drive cog belts (40) is more fully described in copending application U.S. Ser. No. 902,214 previously referred to herein. Such mechanism is used to in seriatim place cassettes at the read site for removal of the photosensitive material and delivery to the reader and to unloading sites after the photosensitive material has been returned to the cassette. Referring to FIGS. 3–12 and 14 there is illustrated a mechanism (50) for gripping a cassette at the load site and positioning the cassette within the reader such that the photosensitive film therein may be removed by the reader (12). The mechanism (50) also serves to return the cassette back to its respective cassette position when the reader has completed its reading operation and returned the photosensitive element back within the respective cassette. The mechanism (50) includes a first pinch roller assembly (52) pivotally mounted to the frame (51) (see FIG. 2), as best seen by reference to FIG. 2, of the conveyor assembly (36) and a second pinch roller assembly (54) which is also pivotally mounted to the frame of the conveyor assembly (38). While the first and second pinch roller assemblies (52),(54) in the particular embodiment illustrated are shown mounted to the frame (51) of its respective conveyor assembly, the pinch roller assemblies (52),(54) may be mounted directly to the frame (53) of the autoloader (10). The first and second pinch roller assemblies (52),(54) are mounted in the same horizontal plane such that a cassette (20) positioned at the read site (46) may be firmly engaged therebetween. The first and second pinch roller assemblies are substantially identical, like numerals indicating like parts. The first and second pinch roller assemblies (52), (54) each include a support arm (56) having a rear end (58) which is pivotally mounted to frame (51). The pinch roller assemblies (52), (54) further include a support frame (60) located at the forward end (62) of the support arm (56). A motor (64) is secured to frame (60) and has a shaft (66) which extends through an opening, not shown, in frame (60). Secured to the outer end of shaft (66) is a pinch roller (70) designed to clampingly engage a cassette (20) located in the read site (46). In the particular embodiment illustrated, pinch roller (70) is secured to shaft (66) by a Trantorque bushing (72) made by Fenner Manheim. However, it is to be understood that pinch roller (70) may be secured to shaft (66) by any other means desired.

The pinch roller (70) has an upper section (74) and a lower section (76). The upper section (74) has a substantially cylindrical drive surface (78). Drive surface (78) is preferably made of a material which is designed to grippingly engage the side of the adjacent cassette (20). In the particular embodiment illustrated, the drive surface (78) comprises an outer layer (79) of an elastomeric material, and more particular, layer (79) is made of polyurethane. This assists in gripping the sides of the cassettes. The lower section (76) has a generally tapered support drive surface (80) which extends radially outward from the lower end of upper drive surface (78). The tapered support drive surface (80) is made of a hard durable material that can withstand the repeated riding of cassettes along the surface. In the particular embodiment illustrated the drive surface (80) is made of stainless steel. The surface (80) forms an angle $\alpha$ with respect to a plane perpendicular to upper drive surface (78). The angle $\alpha$ may have a wide range of values as desired, for example from about 5° to about 40°, preferably from about 10° to about 25°. In the particular embodiment illustrated $\alpha$ is about 15 degrees. Tapered lower section (76) allows the forward end of cassette (20) which is grippingly engaged to be lifted form the support surface (80) to reduce drag as the cassette traverses that surface.

Figure 10:
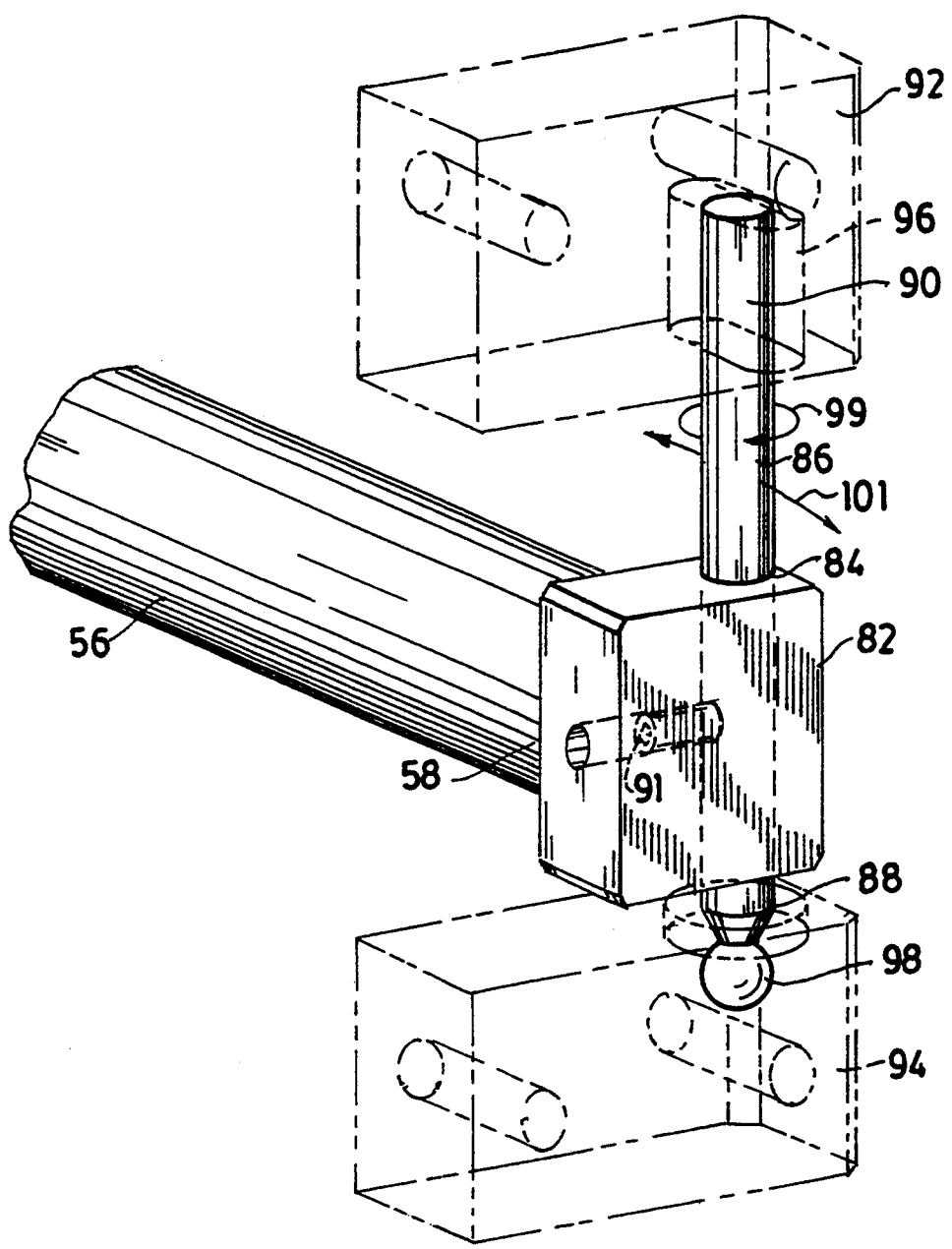
FIG. 10 is an enlarged perspective view of the rear portion of one of the arms of one of the pinch roller assemblies illustrated in FIG. 4 illustrating how the pinch roller assembly is mounted to the autoloader.

Referring to FIG. 10 there is illustrated the pivotal mounting of arm (56) and how it is mounted to frame (51). In particular there is provided a block (82) having a cylindrical hole (84) which extends through the block (82) and is oriented such that the axis of the cylindrical hole (84) is substantially parallel to the axis of the shaft (66) of motor (64). A cylindrical mounting pin (86) extends through hole (84) and has a lower end (88) and an upper end (90). The pin (86) is secured to block (82) by set screw (91). The cylindrical mounting pin (86) is mounted between an upper mounting block (92) and lower mounting block (94) which are secured to frame (51) of the respective conveyor assembly. The upper mounting block (92) is provided with an elongated slot (96) which allows the pin (86) to move in a single direction substantially parallel to the direction of movement of the cassette (20) into reader (12). The lower end (88) has a ball mount (98) designed to be received within a generally spherical opening/socket provided in lower mounting block (94), thus providing a typical ball and socket joint. The ball mount (98) allows the pin to rotate in any direction. However, the elongated slot (96) in upper block (92) restricts movement of the pin such that the pin (86) can rotate only about two axes, that is, rotation about the shaft axis as indicated by arrow (99) and about an axis perpendicular to the slot (96) and passing through the center of ball (98) as indicated by arrow (101). This motion allows the rollers (70) to follow the movement of the cassette (20) as it is fed into the reader (12) by allowing the arm (56) to tip up when the cassette moves up when clamped.

Figure 3:
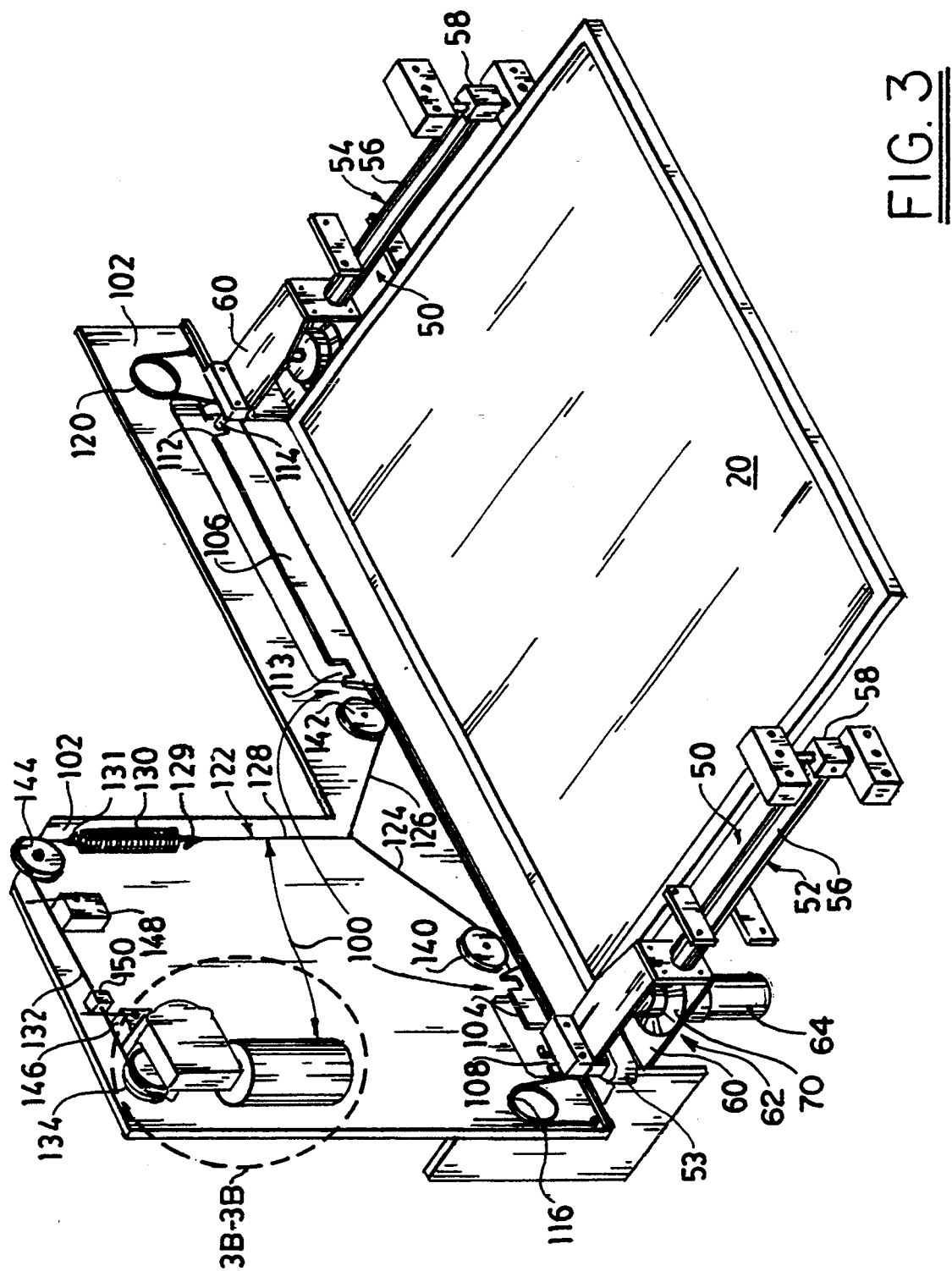
FIG. 3 is a perspective view of the mechanism of the autoloader used to deliver the cassettes from the read site within the autoloader to the reader and then return the cassettes back to the read site.
Figure 3A:
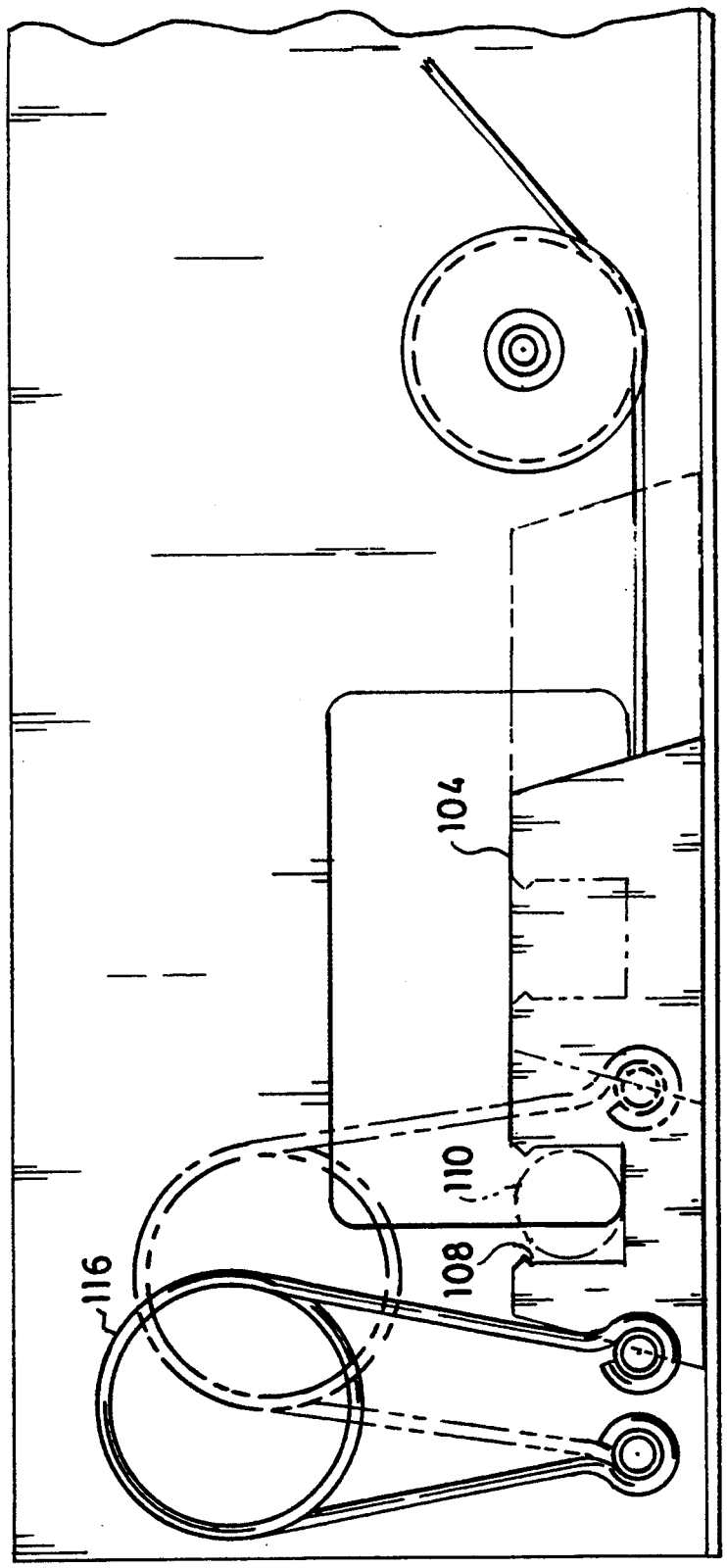
FIG. 3A is an enlarge fragmentary view of a portion of the mechanism of FIG. 3 as outlined by line 3A—3A.
Figure 3B:
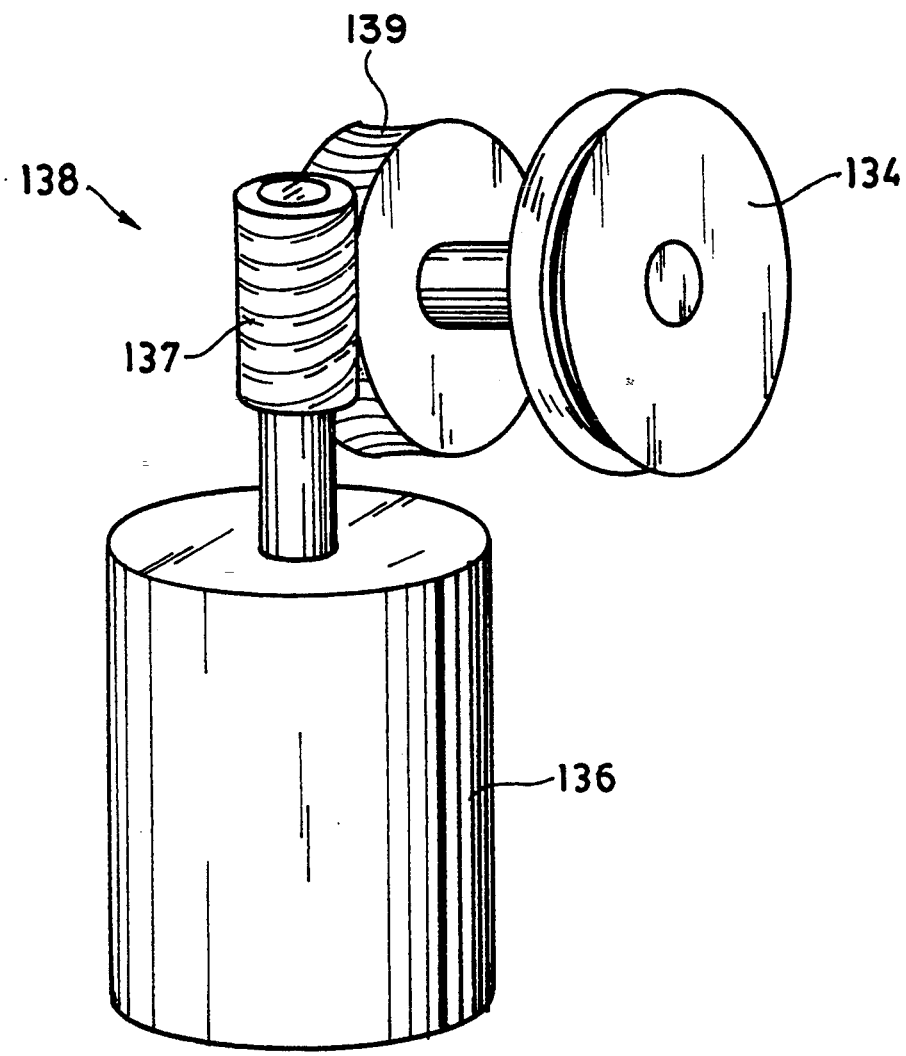
FIG. 3B is an enlarged view of a portion of the mechanism of FIG. 3 as taken along line 3B—3B.
Figure 5:
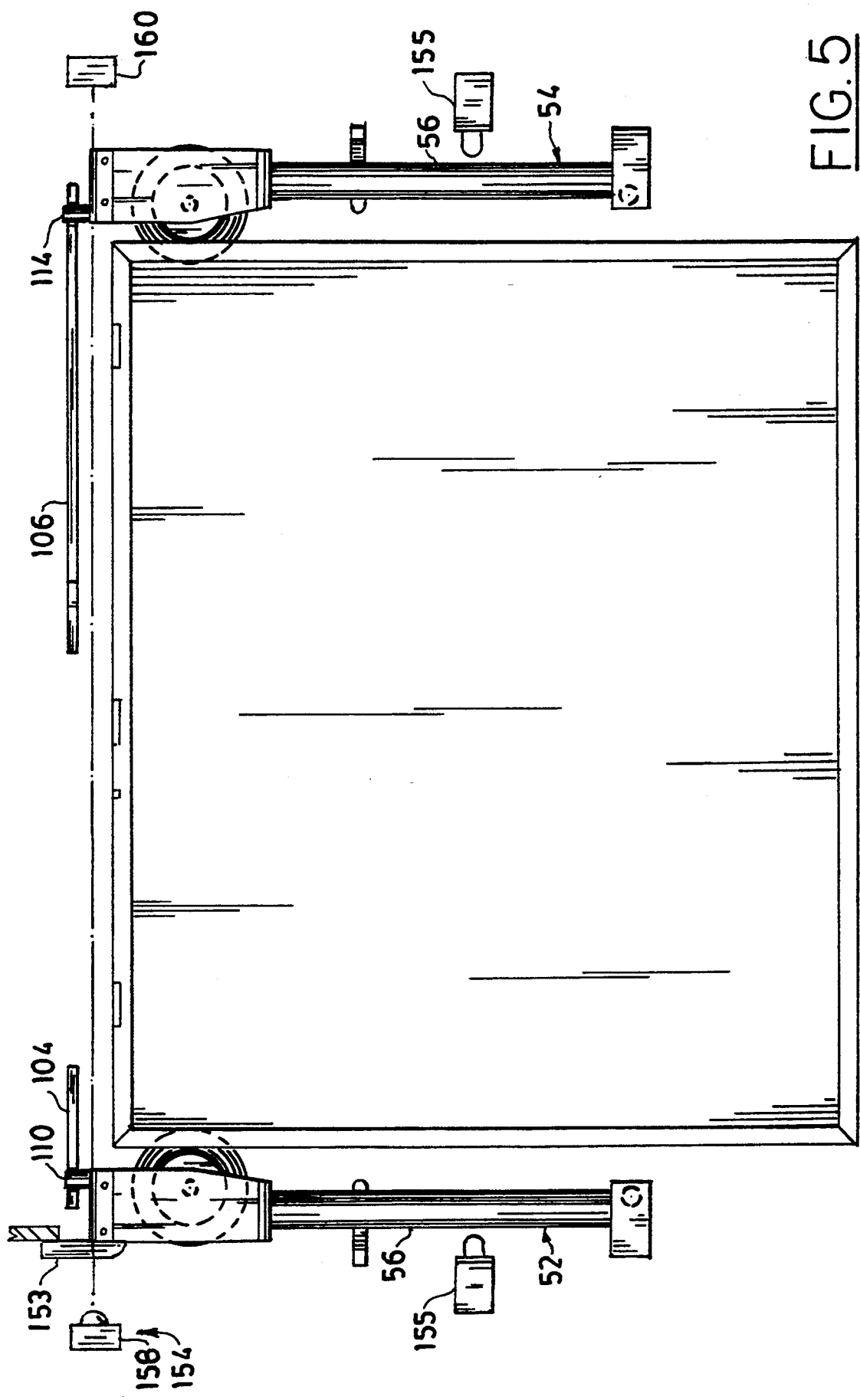
FIG. 5 is view similar to FIG. 4 illustrating the pinch roller assemblies in initial engagement with the cassette at the read site.

The mechanism (50) for advancing and removing the cassette (20) from the reader further includes means for biasing the pinch rollers (70) at spaced rest position, moving the pinch rollers toward each other so that they engage the cassette therebetween, driving the cassette in a predetermined direction, and for releasing engagement therewith. In particular referring to FIG. 3 there is illustrated a biasing mechanism (100) mounted to the back plate (102) of the autoloader (10). The biasing mechanism (100) includes a first slide bar (104) that is slideably mounted to back plate (102) and a second slide bar (106) which is also slideably mounted to back plate (102). The slide bar (104) has a capture recess (108) designed to receive a projection (110) secured to the forward end of support frame (60) of the first pinch roller assembly (52). The position of projection (110) in slide bar (104) is illustrated by a dotted line in FIG. 3A. The second slide bar (106) is provided with a pair of capture recesses (112), (113) for receiving a projection (114) formed at the forward end (62) of frame (60) (62) of the second pinch roller assembly (54). The slots (108),(112),(113) have a generally U-shaped configuration with the open end facing upward. The sides of the slots have a height such that the projections placed therein can slide in a vertical direction to accommodate vertical movement of the pinch roller assemblies while still maintaining side contact for horizontal movement of the slide bar. The first capture recess (112) is designed to receive projection (114) when the cog belts (40) are positioned at a first predetermined distance apart and the second capture recess (113) is designed to receive the projection (114) when the cog belts (40) are placed in a second spaced position for receiving a cassette of a smaller size. In the particular embodiment illustrated the cog belts (40) are spaced apart such that the projection (114) is received in capture recess (112). A first torsion spring (116) is provided for normally biasing slide bar (104) such that the first pinch roller assembly (52) is positioned away from cassette (20). In a like manner, a second torsion spring (120) is provided for biasing the second slide bar (106) for maintaining the second pinch roller assembly in a position away from the other side of the cassette (20). A split cable (122) is provided having legs (124),(126),(128). Leg (124) is secured to slide bar (104), second leg (126) is secured to the inner end of slide bar (106), and third leg (128) is secured to the lower end (129) of a spring (130). The upper end (131) of the spring (130) is connected to one end of drive cable (132), while the other end of the drive cable (132) is mounted to a take up reel (134) secured to a worm gear reduction assembly 138 which is secured to the autoloader in any conventional manner. Referring to FIG. 3B there is illustrated an enlarged view of the worm gear reduction assembly (138) which includes a motor (136), a worm (137) secured to the shaft of motor (136), a worm gear (139) which is operatively connected to take up reel (134) for winding of the cable (132) thereon. When the motor (136) is activated it will cause the take up reel (134) to provide a pulling force on drive cable (132). Idler pulleys (140),(142) and (144) are provided so as to direct the motion of split cable (122) and drive cable (132) as it winds the drive cable (132) onto reel (134). In particular, idler pulley (140) is placed adjacent slide bar (104) such that a pulling force on leg (124) will cause the slide bar (104) to travel in a substantially horizontal direction toward the other slide bar. Likewise idler pulley (142) is mounted such that the pulling force applied to leg (126) of split cable (122) will cause the slide bar (106) to move in a substantially horizontal direction toward slide bar (104). Pulley (142) is positioned such that a pulling force is applied at a substantially vertical direction to the upper end of spring and thereby apply substantially equal force to both legs (124), (126). In the particular embodiment illustrated spring 116 is slightly weaker then spring 120 so that arm stop (153) provided on frame (60) will determine the location of the left side of the cassette by locating against a mating surface stop on the autoloader or reader. In the particular embodiment illustrated, spring (116) is designed to provide a force of about 6 lbs and spring (120) is designed to provide force of about 8 lbs of force, thus providing about a 2 lbs force differential. This allows the arm stop (153) provided on pinch roller assembly (52) to establish a reference point for locating one side of the cassette. However the present invention is not so limited. If desired, the arm stop may be omitted and the strength of springs (116),(120) may be made substantially equal. In this situation, the cassette when clamped by the pinch roller assemblies (52),(54), as illustrated by FIG. 5, would be able to freely move in the horizontal direction. This would allow the use of other means for aligning the cassette with the mechanism for extracting the photosensitive plate from the cassette.

A pair of switches (146), (148) are provided along the path of drive cable (132) which are electrically connected to microprocessor of the autoloader for controlling the operation of motor (136) as will be described later herein. An actuation member (150) is secured to the drive cable in between switches (146) and (148) and has a configuration such that it will engage either of the switches (146), (148) as the cable is moved in that direction.

Figure 4:
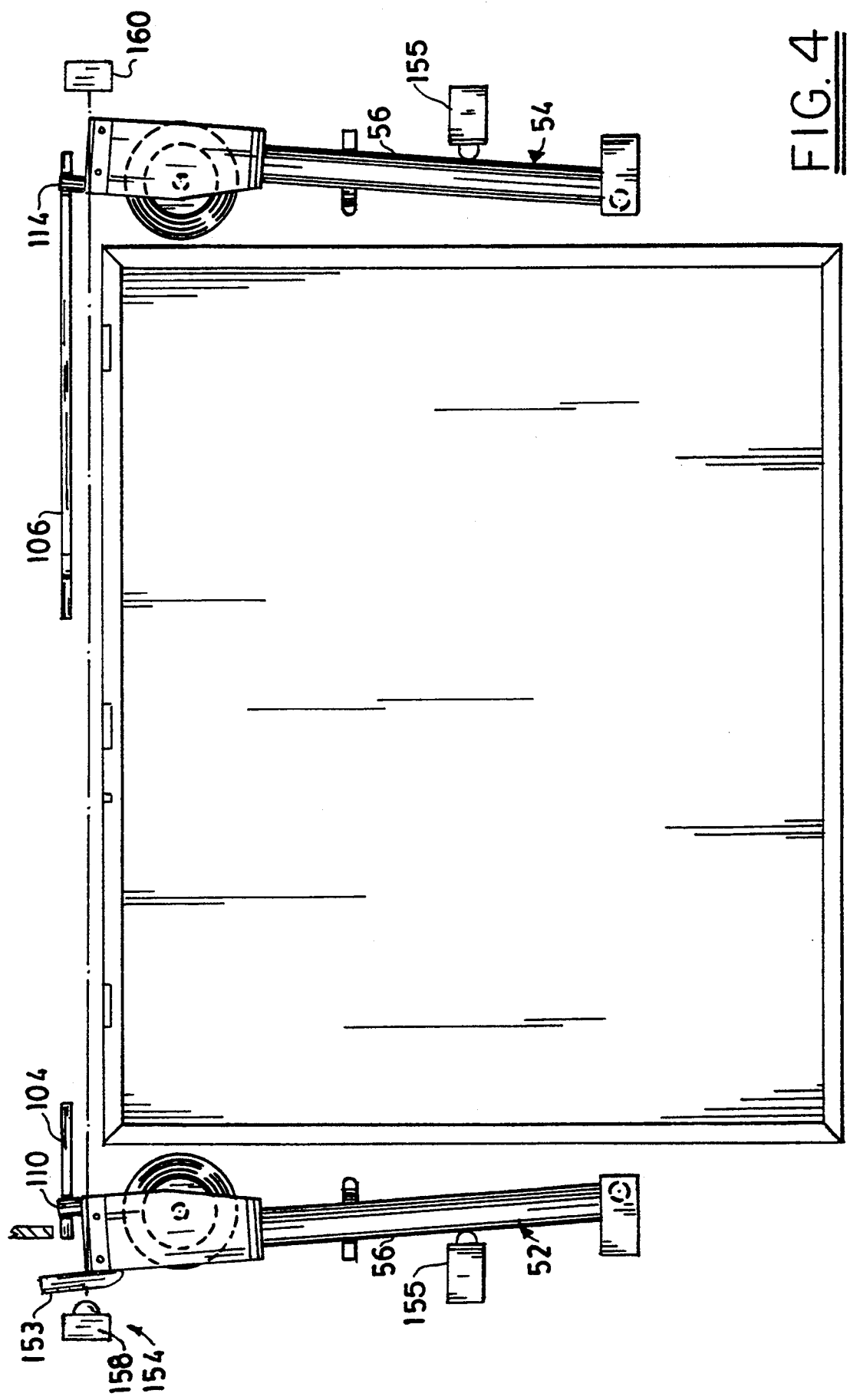
FIG. 4 is partial top plan view of the mechanism of FIG. 3 illustrating the pinch roller assemblies in the non-engaged position with respect to a cassette placed at the read site.

In the preferred embodiment illustrated means are provided for determining when the pinch roller assemblies (52),(54) are either in the engaged or non engaged position. Referring to FIGS. 4 and 5, switches (151) are place adjacent each of the arms (56) of pinch roller assemblies (52),(54). The switches are appropriately electrically connected to the autoloader as is well known to those skilled in the art and are also connected to the microprocessor controlling the autoloader for monitoring the status of the pinch roller assemblies. The switches (151) are positioned such that when the arms (56) are in non engaged position with respect to the cassette (20) as illustrated in FIG. 4 the switches (151) are engaged and when the pinch roller assemblies are in the engaged position with respect to the cassette (20) the switches are not engaged as illustrated in FIG. 5.

Means are also provided for monitoring the position of the cassette at the read site (46) and for controlling the operation of motors (64) so that the cassette can be properly positioned back on the shelves at the read site (46). In particular, a light sensor assembly (154) is provided adjacent the cassette (20) at opening (24). The light sensor assembly (154) includes a light source (158) and a sensor assembly (160) which are positioned such assembly (154) will sense when a cassette (20) is passing through opening (24) and when the leading or trailing edge (as viewed from the direction of travel of the cassette) of the cassette (20) passes that point. Thus, the cog belts (40) can be prevented from operating if a cassette is present in this area. Additionally when the cassette is being returned to the read site (46) from the reader the light sensor assembly (154) can be used to monitor the trailing edge of the cassette (20) and turn power off to motors (64) so that the cassette (20) can be properly placed back on the shelf at the read site.

Referring to FIGS. 4 and 5, means are provided for sensing when the pinch roller assemblies are either engaged or not engaged with a cassette at the read site. In particular, a pair of switches (155) are provided, one adjacent each of the arms(56). When the pinch roller assemblies are spaced apart as to receive a cassette as shown in FIG. 4, the switches are activated so as to produce a signal that is sent to the microprocessor control unit controlling the autoloader, and when the pinch roller assemblies are in the clamping position, as illustrated in FIG. 5, the switches are not activated which is also sensed by the microprocessor control unit.

Figure 12:
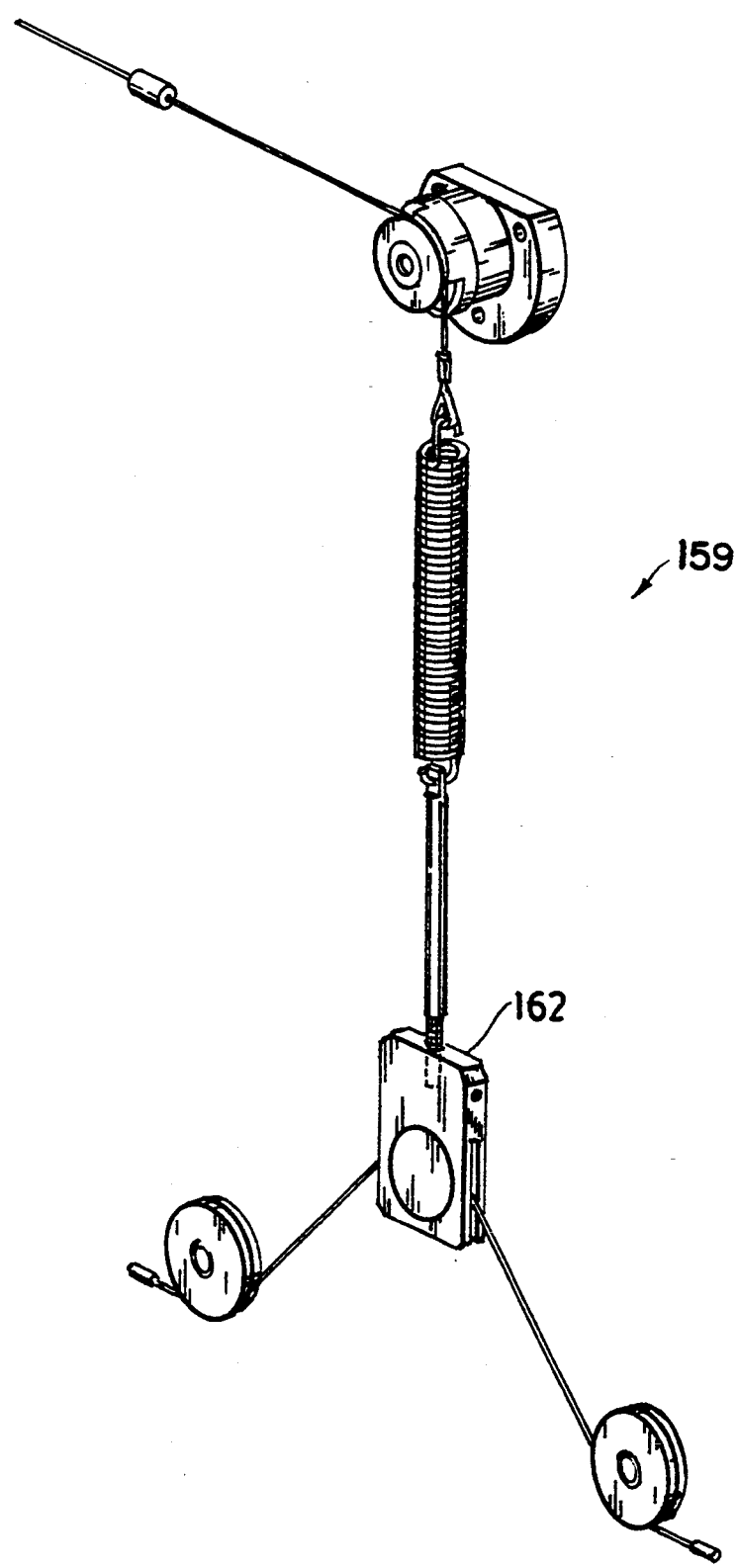
FIG. 12 is a perspective view of an alternate cable arrangement for use in the biasing means of FIGS. 2 and 3.
Figure 13:
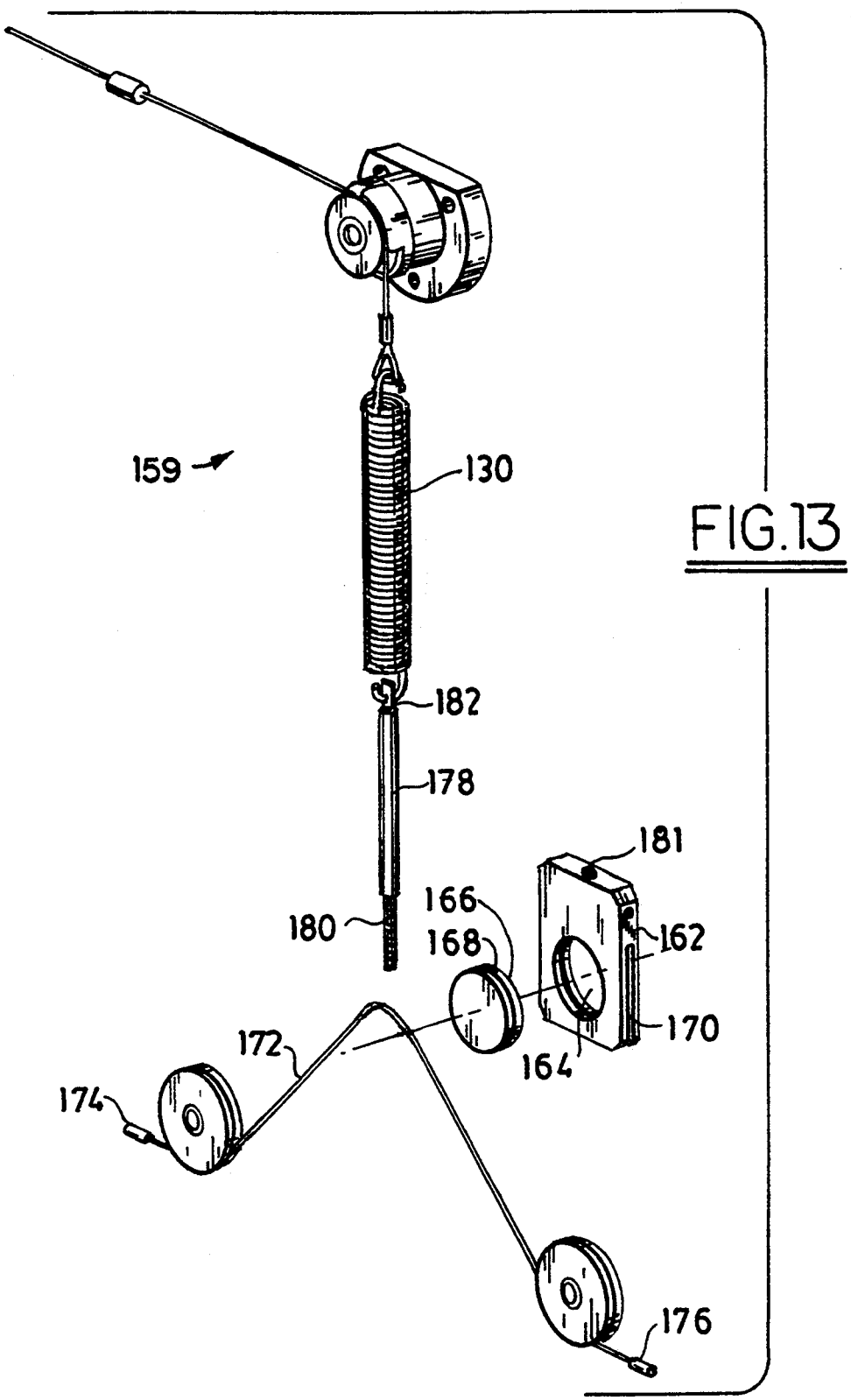
FIG. 13 is an exploded perspective view of FIG. 12.
Figure 14:
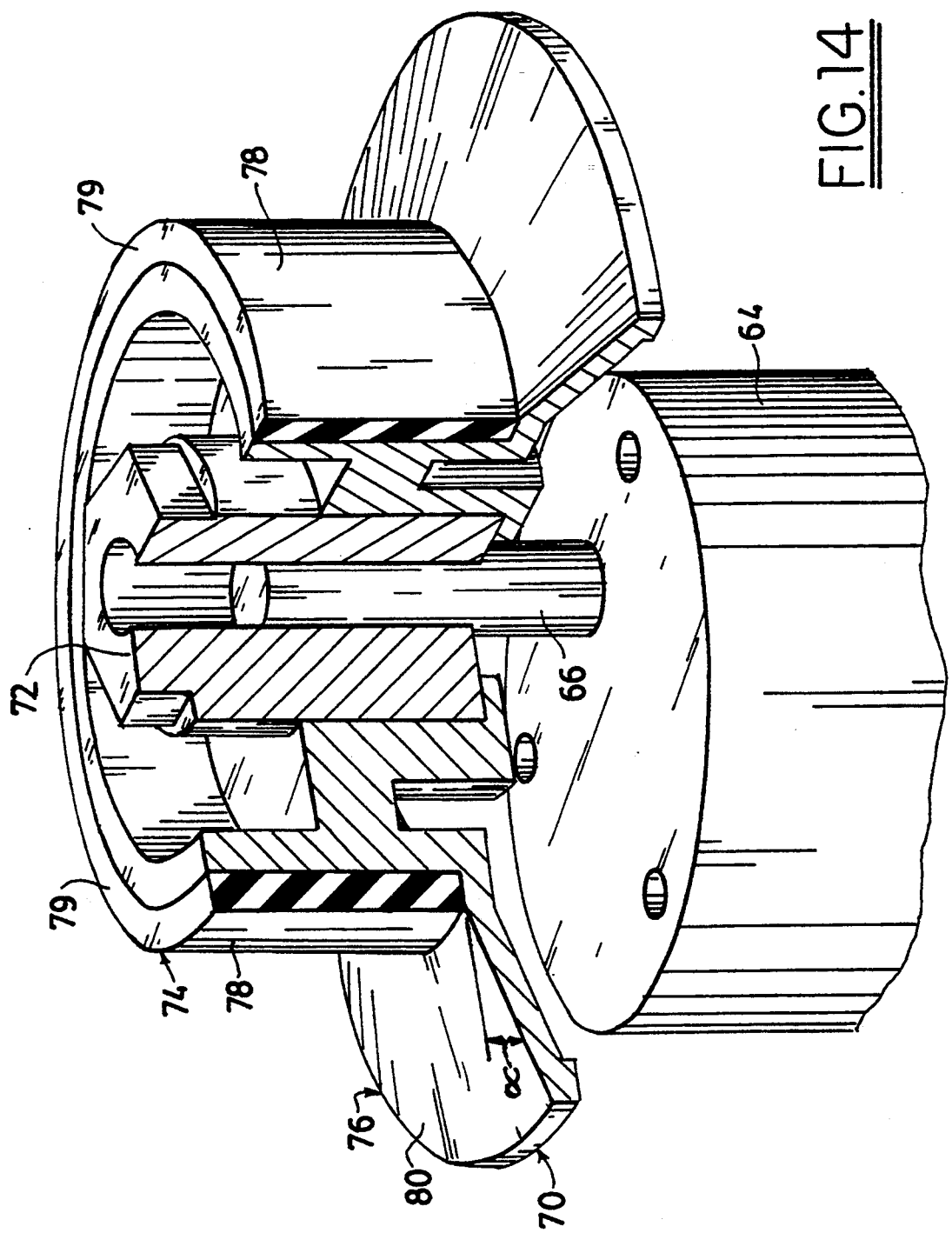
FIG. 14 is an enlarged perspective view of a pinch roller, partially broken away, and its associated drive motor which is utilized in the pinch roller assemblies made in accordance with the invention.

Referring to FIGS. 12 and 13 there is illustrated an alternate cable arrangement used to move the slide bars. In place of the split cable (122) there is provided a cable assembly (159) includes a block (162) having an generally circular opening (164) for receiving a circular pulley (166) designed to fit with opening (164). Pulley (166) has an annular groove (168) about its periphery. The block (162) also includes a slot (170) which extents from the bottom of the block (162) up to about to the top of the opening (164) and is sized so that cable (172) can pass through slot (170) and engage pulley (166) within groove (168) in pulley (166). The cable (172) has a first end (174) secured to slide bar (104) and a second end (176) secured to slide bar (106). A connecting rod (178) is provided having a threaded lower end (180) designed to engage a threaded opening (181) provided on the top of block (162) and an upper end having an opening (182) designed to engage the lower end of spring (130). This construction allows the cable (172) to self adjust with respect to the force being applied to the two slide bars (104),(106) and also avoids any concentration of forces applied to any single point on the cable (172).

Figure 11:
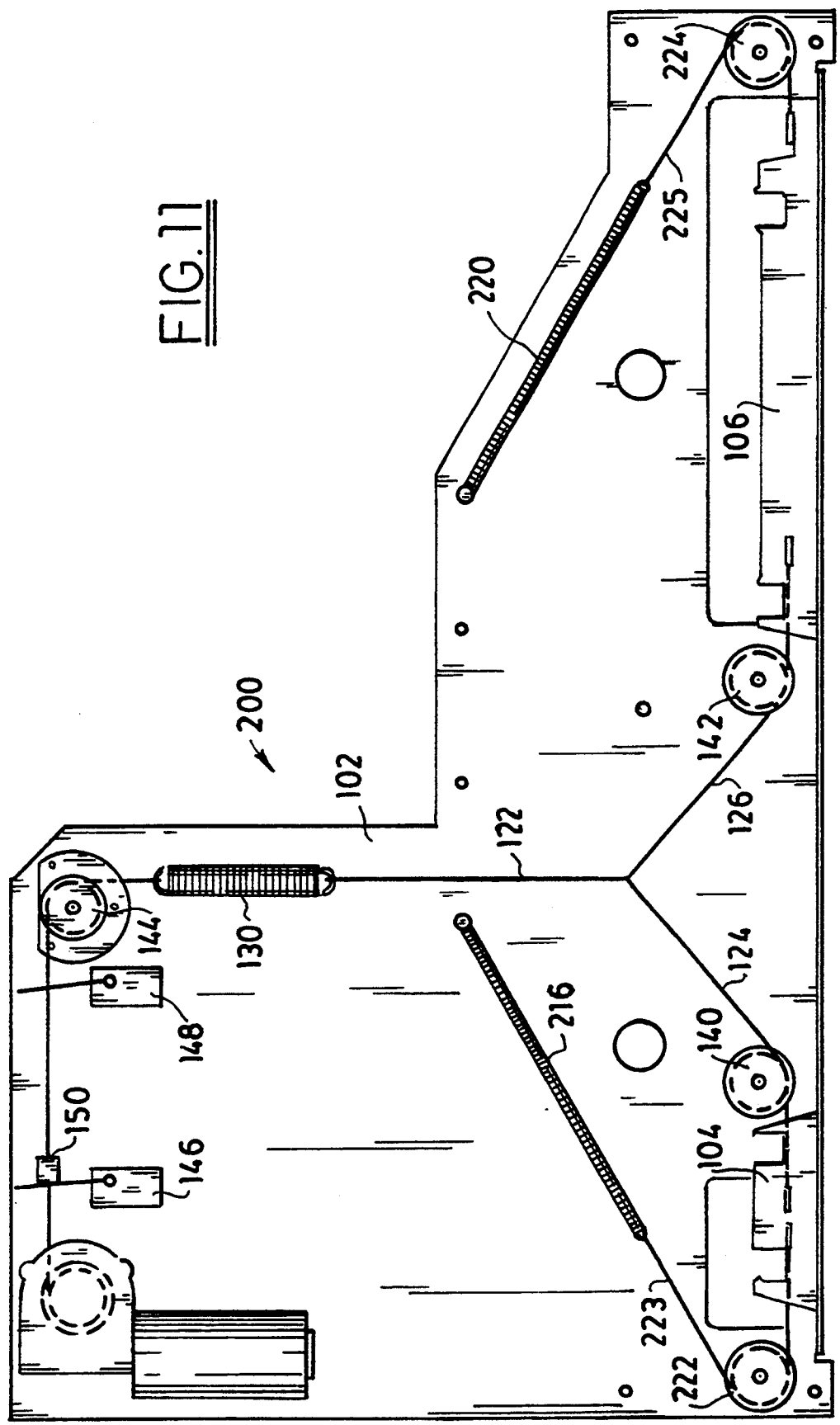
FIG. 11 is a front elevational view of a portion of the mechanism of FIG. 4 illustrating modified means for applying a biasing force to the pinch roller assemblies.

Referring to FIG. 11 there is illustrated of a modified biasing means (200) which is similar to biasing mechanism (100), like numerals indicating like parts. The only difference being the manner in which the slide bars (104),(106) are biased. In place of torsion springs (116),(120), coil springs (216), (220) are used in conjunction with a pair of idler pulleys (222),(224) and connecting cables (223),(225). Cable (223) having one end connected to one end of spring (216) and the other end of cable (223) being connected to slide bar (104) opposite leg (124) of cable (122). Cable (225) having one end connected to one end of spring (220) and the other end of cable (225) being connected to slide bar (106) opposite leg (126) of cable (122). The second end of springs (216),(220) being anchored to the back plate of the autoloader (10). The springs (216),(220) apply a biasing force so as to maintain the slide bars and associated pinch roller assemblies away from each other, as illustrated in FIG. 4.

Figure 6:
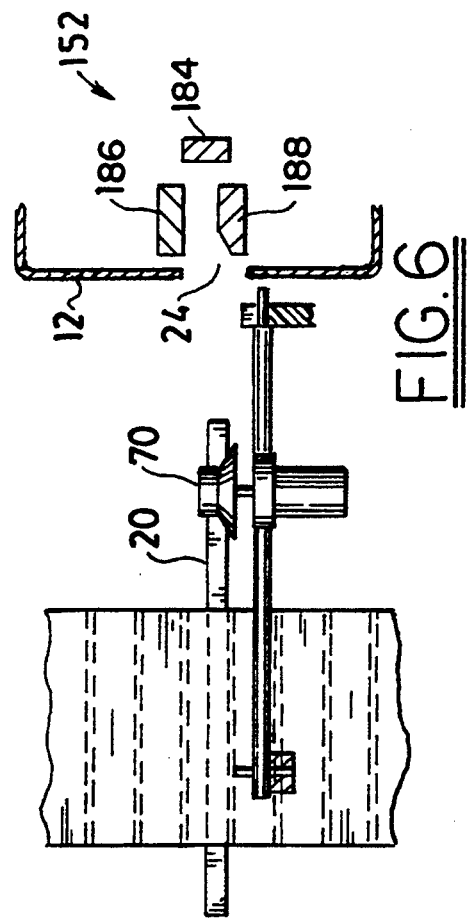
FIGS. 6–9 are enlarged partial side views of the mechanism of FIG. 3 illustrating the progressive movement of the cassette from the read site to the presentation position in the reader for removal of the photo stimulable sheet from the cassette by the reader.
Figure 7:
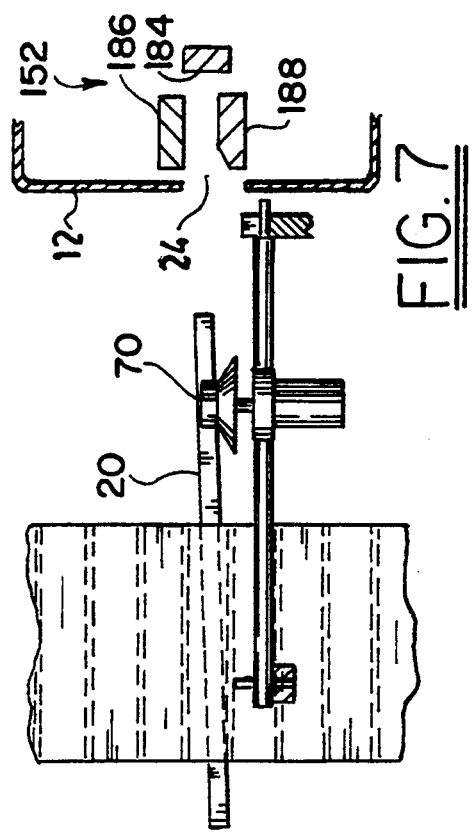

In order to more clearly understand the present invention, a detailed description of its operation will now be discussed. First, the operator opens the door assembly to the autoloader (10) and places cassettes (20) to be read in the loading sites (44). It is to be understood that the cassettes (20) may be placed directly on the shelves or on pallets designed to receive the cassettes which are in turn designed for placement on the shelves. Any cassettes that have been read and are present in the unloading sites (44) may also be removed by the operator. After this has been completed the operator will close the door assembly (32) and allow the autoloader to operate in its designed operational mode. Accordingly, the autoloader (10) then operates the endless cog belts (40) so as to locate the appropriate cassette at the read site (46). Once the appropriate cassette (20) has been located at the read site (46) the cassette (20) will be in the position as illustrated in FIGS. 4 and 6. Thereafter the biasing mechanism (100) is activated by turning on motor (136) winding drive cable (132) on to take up reel (134) which causes a pulling force to be applied to spring 130. The pulling force is transmitted through spring 130 to the third leg (128). The force is then transmitted to first and second legs (124) and (126) which, in turn, causes the force to be applied to slide bars (104),(106) resulting in the slide bars (104),(106) being moved toward each other. Since projection (110) of support frames are secured to the frame of each of the roller assemblies (52),(54) the pinch roller assemblies (52),(54) will be caused to be moved toward each other and clampingly engage the cassette (20) placed therebetween. As each pinch roller assembly (52),(54) engages the cassette (20) therebetween, its movement will be resisted. As previously discussed spring (116) is weaker than spring (120), thus the projection (53) of pinch roller assembly (52) will seat against stop provided on the autoloader or reader leaving pinch roller assembly to apply the final clamping force therebetween as illustrated in FIG. 5. The drive motor (136) will continue to apply force until such time as the actuation member (156) engages switch (148) at which time the motor (136) will be turned off. The worm gear arrangement as illustrated in FIG. 3B assists in providing a breaking function so that a substantially constant force will be maintained. The spring (130) limits the amount of force that is being applied to the sides of the cassette (20) by pinch roller assemblies (52),(54). Once the motor (136) is stopped, the drive motors (64) of each of the pinch roller assemblies (52),(54) are turned on so that they rotate in a direction that will advance the cassette (20) toward the reader (12).

Figure 15:
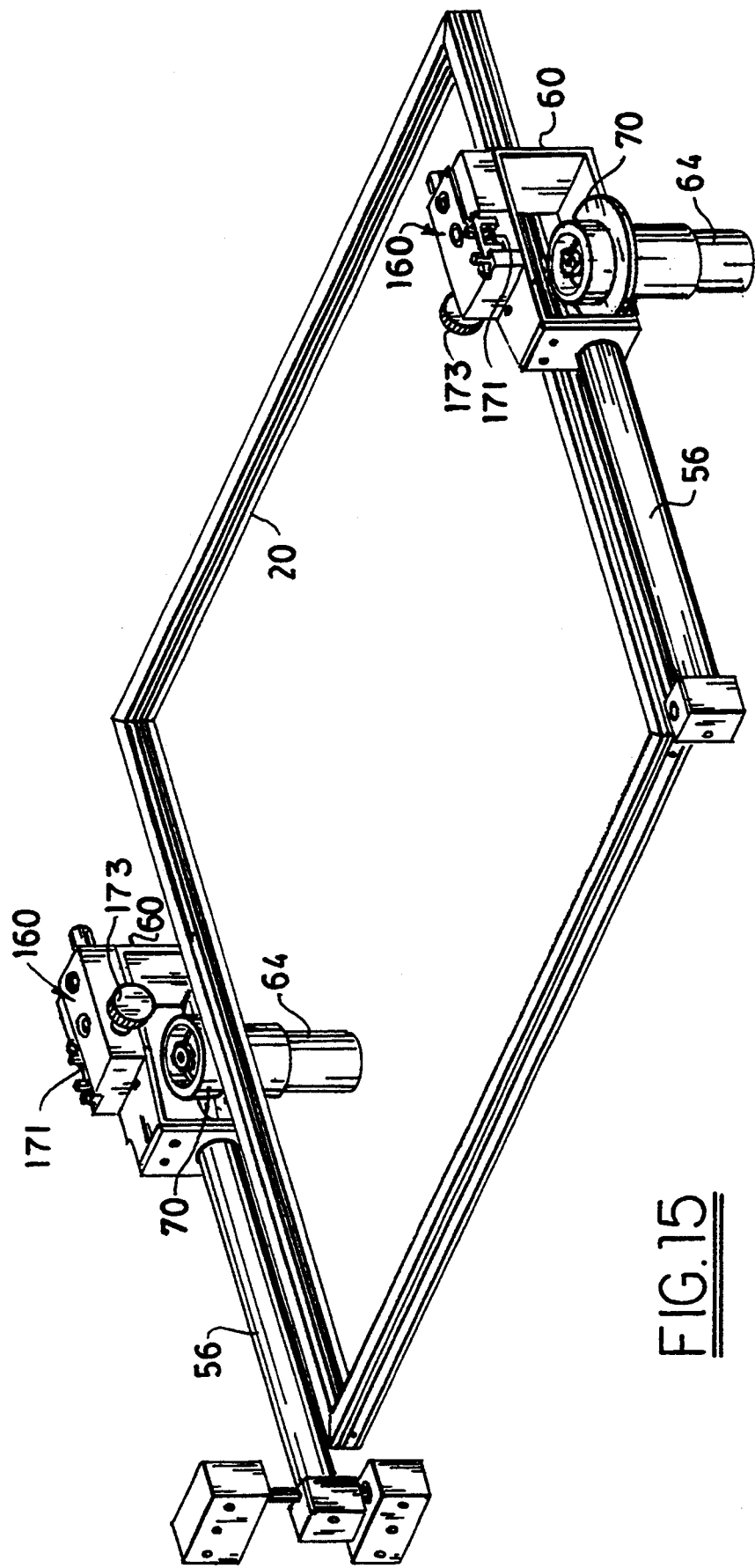
FIG. 15 is a perspective view a pair of pinch roller assemblies made in accordance with the present invention having an optional sensor for determining if a cassette is properly positioned above the read site, with the outline of a cassette located at the read site.
Figure 16:
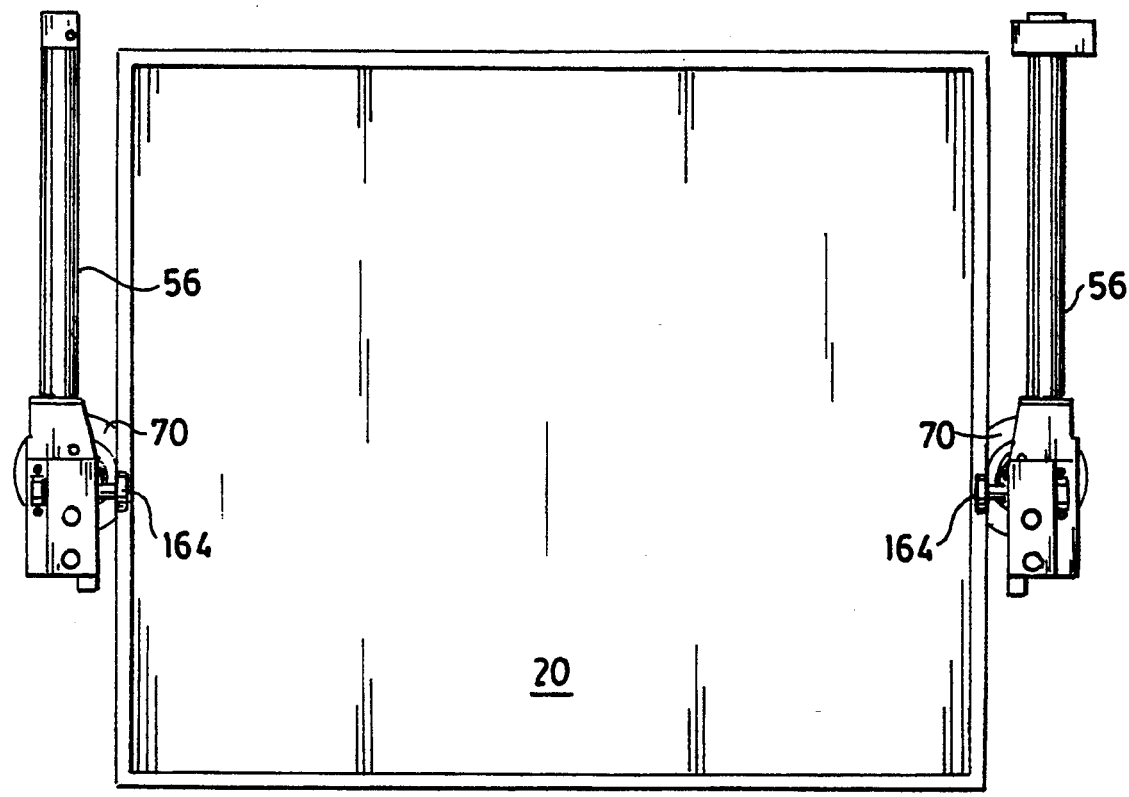
FIG. 16 is a top plan view of FIG. 15 illustrating a cassette at the read site.
Figure 17:
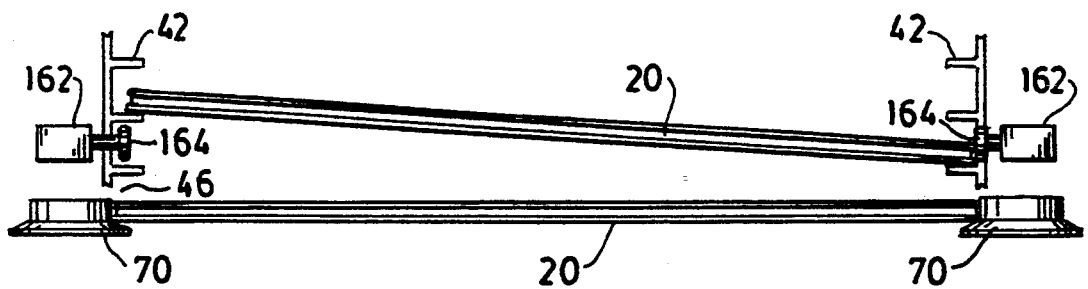
FIG. 17 is a front elevation view of FIG. 16 illustrating a cassette incorrectly positioned above the read site.

Referring to FIGS. 15-17, there is illustrated an optional sensor means for determining if a cassette is properly positioned at the retaining site directly above the read site (46). In FIG. 15, there is illustrated a perspective view of a portion of the mechanism (50) illustrated in FIG. 1-14, like numerals indicating like parts. In this embodiment, a pair of sensor assemblies (160) are provided, one associated with each pinch roller assembly (52),(54). Sensor assembly (160) is disposed atop support frame (60) and includes a switch (171) having a activation member (173) designed to engage the sides of a cassette placed in the retaining site directly above the read site (46). When no cassette is present in the cassette retaining site directly above the reading site (46), the activation members (173) will be fully extended. However, when a cassette is properly placed in the retaining site, the activation members (173) will be depressed so as to provide an appropriate signal to the microprocessor control unit. In certain situations, it may be possible to incorrectly position a cassette in the cassette retaining site. Referring to FIG. 16, there is illustrated a cassette which has one side placed in the cassette retaining site directly above the read site (46) and the other side placed in the next above cassette retaining site. As can be seen, the cassette is not properly placed in a single cassette retaining site and can not be properly fed to the adjacent reader. In this situation only one of the activation members will be depressed, therefore, only one of the switches (171) will send a signal to the microprocessor. The microprocessor can be properly programmed to note that only one of the switches (171) has been activated and this can stop the autoloader from any further action that can cause damage and provide an appropriate error message to the operator. While in the particular embodiment illustrated sensor assembly is a mechanical sensor, it is to be understood that any desired sensor may be utilized to determine if the side of the cassette is in the adjacent retaining site.

Figure 8:
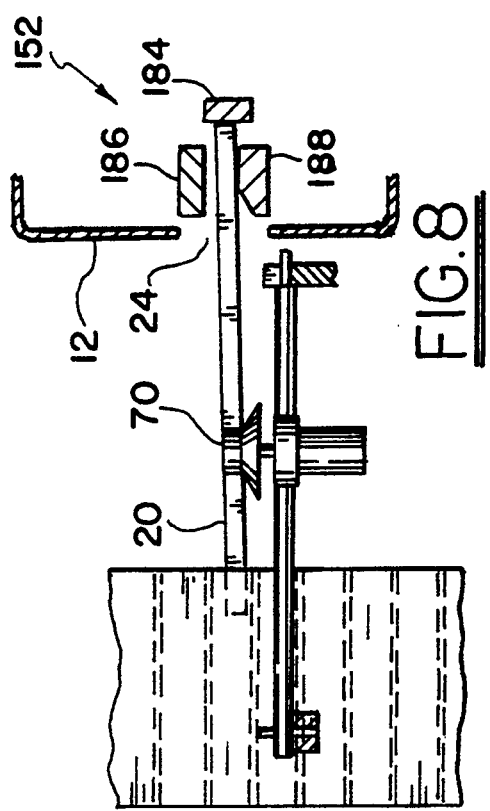
Figure 9:
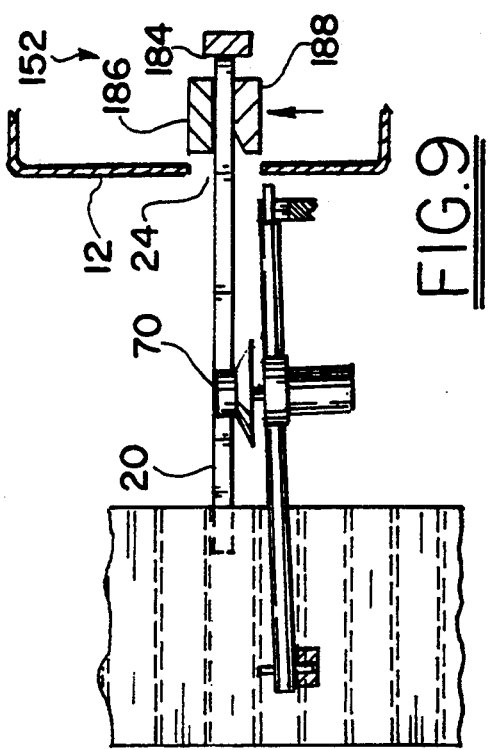

Referring to FIGS. 6–9 there is illustrated in sequence the movement of a cassette (20) being fed into the reader (12). As can be seen, there is an opening (24) through which the cassette (20) is fed from the autoloader (10) into the adjacent reader (12). Directly adjacent opening (24) inside reader (12) there is provided a clamping mechanism (152) for clamping of a cassette (20) after it has been fed into the reader (12). In particular the clamping mechanism comprises a backstop (184) and upper clamp jaw (186) and lower clamp jaw (188). As the cassette is driven into reader (12) the forward end of the cassette will be lifted from the shelves such that only the trailing edge of the cassette will be dragged along the shelf. The cassette is moved into the reader until it hits backstop (184) as illustrated in FIG. 8. The motors (64) are left on until the cassette has been completely clamped as illustrated in FIG. 9. This lifts the cassette (20) off the cog belts (40). At this time the motors (64) are turned off and the pinch roller assemblies (52),(54) are returned to the disengaged position by springs (116),(120) as illustrated in FIG. 4. Thereafter the photographic element to be read is removed from the cassette (20) in any desired manner. In one particular embodiment, this is done through a mechanism as set forth a patent application filed concurrently herewith entitled "Reader Having Cassette Locating and Unlatching Mechanism" of Roger Brahm and James Lattimore, which is hereby incorporated by reference. The cassette in the clamped position is substantially free of any contact with the autoloader. Thus, in this position no substantial vibration will be transferred from the autoloader to the reader. This is of extreme importance when reading photo stimulable phosphorous plates. After the reader (12) has completed its reading of the photosensitive element it is then returned to cassette (20). The biasing means (100) is energized so that the pinch rollers engages the sides of the cassette (20). The clamping mechanism releases the cassette (20) and then the motors (64) of the first and second pinch roller assemblies (52),(54) are activated in the reverse direction so as to cause the cassette (20) to return back to the position illustrated in FIG. 5. Once the light sensor assembly (154) senses the trailing edge of the cassette 20, the motors (64) are turned off, thus providing means for accurately positioning the cassette back on the shelf of the cog belts (40). Thereafter, the autoloader activates the endless cog belts (40) such that the cassette at the next higher cassette site (44) is moved to the reading site (46) wherein the entire process is repeated. The cassette that has been read is lowered to one of the unload positions identified by letters A–J as illustrated in FIG. 2.

The present invention provides a mechanism for transferring of cassettes from the autoloader to an adjacent reader and back to the autoloader in a reliable manner while also precisely positioning of the cassette within the reader to allow proper clamping of the cassette and permit removal of the storage phosphorous film therein. The mechanism is also designed to minimize transfer of vibration to the reader which can adversely affect the reading of the photographic element.

It is to be understood that various changes and modifications may be made without departing from the scope of the present invention, the present invention being limited by the following claims.

We claim:

1. A mechanism for conveying a generally flat rectangular rigid article from a support surface, comprising:
   a first pinch roller having a central axis about which the first pinch roller rotates, said first pinch roller being pivotally mounted to said mechanism about a first substantially vertical axis, said first pinch roller having an upper section and a lower section, said upper section having a substantially cylindrical upper drive surface and said lower section having a generally tapered lower support drive surface which extends radially outward from and below the cylindrical upper drive surface;
   a second pinch roller having a central axis about which the second pinch roller rotates, said second pinch roller being pivotally mounted to said mechanism about a second substantially vertical axis, said second pinch roller having an upper section and a lower section, said upper section having a substantially cylindrical upper drive surface and said lower section having a generally tapered lower support drive surface which extends radially outward from and below the cylindrical upper drive surface;
   means for moving said first and second pinch rollers from a spaced rest position toward each other so as to engage a cassette therebetween with a predetermined amount of biasing force; and
   means for rotating said first and second pinch rollers about their respective axis so as to move said cassette from and/or on to said support surface.

2. A mechanism according to claim 1 further comprising first and second pinch roller arms, one associated with each of said pinch rollers, said pinch roller arms each having a first end and a second end, said first and second pinch rollers being rotatably mounted to said first end of one of said pinch roller arms and the second end of the arms being pivotally mounted to said mechanism.

3. A mechanism according to claim 2 wherein said means for moving said first and second pinch rollers toward each other comprises:
   a split cable having first, second and third free ends,
   a first slide bar having means for engaging said first pinch roller arm for moving said first pinch roller in a predetermined direction, the first free end of said cable being connected to said slide bar;
   a second slide bar having means for engaging said second pinch roller arm for moving said second pinch roller in a predetermined direction, the second end of the cable being connected to said second slide bar;
   means for applying a biasing force on said first and second slide bars so as to move said first and second pinch rollers away from each other; and
   means for applying a pulling force on the third free end of said cable so as to over come the biasing force being applied to said first and second pinch rollers and cause the first and second pinch rollers to move toward each other.

4. A mechanism according to claim 3 wherein said means for applying a biasing force on said first and second pinch rollers comprises a coil spring.

5. A mechanism according to claim 3 wherein means for applying a pulling force comprises a reversible motor.

6. A mechanism according to claim 3 wherein said means for applying a pulling force further includes means for controlling the amount of force being applied.

7. A mechanism according to claim 6 wherein said means for controlling the amount of force being applied comprises a coil spring and a drive cable connecting the third free end of cable to said reversible motor.

8. A mechanism according to claim 7 further comprising means for maintaining a substantially constant pulling force on the drive cable.

9. A mechanism according to claim 8 wherein said means for maintaining a substantially constant pulling force on the drive cable comprises a worm secured to the shaft of said motor which engages a worm gear used to wind the drive cable onto a take up reel secured to said worm gear.

10. A mechanism according to claim 1 further comprising means for allowing the pinch rollers to move in a substantially vertical direction.

11. A mechanism according to claim 1 wherein said pinch rollers are rotated in a substantially synchronous manner.

12. A mechanism according to claim 1 further comprising means for referencing the position of one of said pinch rollers to a predetermined position.

13. A mechanism according to claim 12 wherein said means for referencing the position of one of said pinch rollers comprises a fixed stop which prevents any further movement of the pinch roller toward the other pinch roller.

14. A mechanism according to claim 1 wherein said substantially rectangular rigid article comprises a cassette containing a photosensitive material.

15. A mechanism for conveying a cassette from a support surface, comprising:
   a first pinch roller having a central axis about which the first pinch roller rotates;
   a second pinch roller having a central axis about which the second pinch roller rotates;
   means for moving said first and second pinch rollers from a spaced rest position toward each other so as to engage a cassette therebetween with a predetermined amount of biasing force, and
   means for rotating said first and second pinch rollers about their respective axes so as to move said cassette from and/or on to said support surface wherein said first and said second pinch rollers include means for lifting the forward end of an engaged cassette from said support surface so as to reduce drag as said cassette is translated over said support surface.

16. A mechanism according to claim 15 wherein means for moving said pinch rollers toward each other further comprises means for applying a biasing force on first and second slide bars so as to move said first and second pinch rollers away from each other.

17. A mechanism according to claim 16 wherein said means for moving said first and said second pinch rollers toward each other further comprises means for applying a pulling force on a third end of a split cable extending from said slide bars so as to overcome the biasing force being applied to said first and said second pinch rollers and cause said first and said second pinch rollers to move toward each other.

18. A mechanism according to claim 15 wherein said first and second pinch rollers are pivotally mounted to said mechanism about a first and second substantially vertical axis.

19. A mechanism according to claim 16 wherein said means for applying a biasing force comprises a pair of springs, one associated with each of said pinch rollers.

20. A mechanism according to claim 19 wherein one of said springs provides a greater biasing force than the other spring so that one of said pinch rollers will move prior to the other pinch roller.

21. A mechanism according to claim 15 wherein said means for moving said first and said second rollers are mounted in a manner whereby said means are freely movable when a cassette is clamped between said pinch rollers.

22. A mechanism according to claim 21 wherein said first and said second pinch rollers are pivotally mounted to said frame about a first and a second substantially vertical axis.

23. An apparatus for supplying cassettes to an adjacent reader, comprising:
   a frame;
   means for supporting a cassette at a delivery station;
   a first pinch roller having a central axis about which the first pinch roller rotates;
   a second pinch roller having a central axis about which the first pinch roller rotates;
   a second pinch roller having a central axis about which the second pinch roller rotates;
   means for moving said first and said second pinch rollers form a spaced rest position toward each other so as to engage a cassette therebetween with a predetermined amount of biasing force; and
   means for rotating said first and said second pinch rollers about their respective axes so as to cause said rollers to move a said cassette from and/or on to said support surface wherein said first and said second pinch rollers include means for lifting the forward end of an engaged cassette from said support surface so as to reduce drag as said cassette is translated over said support surface.

24. A method of delivering a cassette containing a photosensitive material from a support surface to an apparatus, comprising the steps of:
   providing a cassette on a substantially horizontal support surface;
   providing means for removing the cassette from the support surface in a substantially horizontal direction while also lifting the forward end of the cassette form the horizontal support surface.

25. A mechanism for conveying a cassette from a support surface, comprising:
   a first pinch roller having a central axis about which the first pinch roller rotates, said first pinch roller being pivotally mounted to said mechanism about a first substantially vertical axis, said first pinch roller having an upper section and a lower section, said upper section having a substantially cylindrical upper drive surface and said lower section having a generally tapered lower support drive surface which extends radially outward from and below the cylindrical upper drive surface;
   a second pinch roller having a central axis about which the second pinch roller rotates, said second pinch roller being pivotally mounted to said mechanism about a second substantially vertical axis, said second pinch roller having an upper section and a lower section, said upper section having a substantially cylindrical upper drive surface and said lower section having a generally tapered lower support drive surface which extends radially outward from and below the cylindrical upper drive surface;

means for moving said first and second pinch rollers form a spaced position toward each other so as engage a cassette therebetween with a predetermined amount of force; and means for rotating said first and second pinch rollers in a synchronous manner about their respective axis so as to move said cassette form and on to said support surface.

26. A mechanism according to claim 25 further comprising first and second pinch roller arms, one associated with each of said pinch rollers, said pinch roller arms each having a first end and a second end, said first and second pinch rollers being rotatably mounted to said first end of one of said pinch roller arms and the second end of the arms being pivotally mounted to said mechanism.

* * * * *